(12) United States Patent
Mickus et al.

(10) Patent No.: US 10,229,758 B2
(45) Date of Patent: Mar. 12, 2019

(54) CONTROL ROD GUIDE TUBE WITH AN EXTENDED INTERMEDIATE GUIDE ASSEMBLY

(71) Applicant: Westinghouse Electric Company LLC, Cranberry Township, PA (US)

(72) Inventors: Vytautas J. Mickus, Mars, PA (US); Ibrahim M. Ezzi, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 15/981,965

(22) Filed: May 17, 2018

(65) Prior Publication Data

US 2018/0277261 A1 Sep. 27, 2018

Related U.S. Application Data

(62) Division of application No. 14/295,521, filed on Jun. 4, 2014, now Pat. No. 10,109,379.

(51) Int. Cl.
*G21C 7/08* (2006.01)
*G21C 7/117* (2006.01)

(52) U.S. Cl.
CPC ............... *G21C 7/08* (2013.01); *G21C 7/117* (2013.01); *Y02E 30/39* (2013.01)

(58) Field of Classification Search
None
See application file for complete search history.

(56) References Cited

U.S. PATENT DOCUMENTS

| 3,915,793 A | 10/1975 | Andersson et al. |
| 5,053,189 A | 10/1991 | Chrise et al. |
| 5,098,647 A | 3/1992 | Hopkins et al. |
| 2012/0099691 A1 | 4/2012 | Shargots et al. |

FOREIGN PATENT DOCUMENTS

| FR | 2630854 | 11/1989 |
| JP | 2007171157 A | 7/2007 |
| JP | 2014154771 A | 8/2014 |
| TW | 201234389 A | 8/2012 |

OTHER PUBLICATIONS

A Search Report from the Republic of China (ROC) (Taiwan) Patent Application No. 104114954, dated Jul. 3, 2018.

*Primary Examiner* — Lily C Garner
(74) *Attorney, Agent, or Firm* — Richard J. Coldren; Westinghouse Electric Company LLC

(57) ABSTRACT

A nuclear reactor having an upper internals control rod assembly guide tube formed from upper and lower sections that are connected along a central axial region of the guide tube at an intermediate coupling. An extended control rod axial support is provided for at least some of the control rods over a finite distance within at least one of the interiors of the lower guide tube section or the upper guide tube section.

16 Claims, 13 Drawing Sheets

CONTROL ROD GUIDE TUBE WITH AN EXTENDED INTERMEDIATE GUIDE ASSEMBLY

CROSS-REFERENCE TO RELATED APPLICATIONS

This application is a division of and seeks priority to U.S. patent application Ser. No. 14/295,521, filed Jun. 4, 2014, entitled: Control Rod Guide Tube With extended Intermediate Guide Assembly.

BACKGROUND

1. Field

This invention relates generally to nuclear reactors and, more particularly, to nuclear reactors that employ top mounted control rods.

2. Related Art

The primary side of nuclear power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer , pumps and pipes, for circulating pressurized water; the pipes connecting each of the steam generators and pumps to the reactor vessel independently. Each of the parts of the primary side comprising a steam generator, a pump and the system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16, through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel 10 through one or more inlet nozzles 30, flows down through an annulus between the reactor vessel and the core barrel 32, is turned 180° in the lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as 37. The coolant flow through the core and surrounding area 38 is typically large, on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate and upwardly through a plurality of perforations 42. The coolant then flows upwardly and radially to one or more outlet nozzles 44.

The upper internals 26 can be supported from the vessel 10 or the vessel head 12 and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

As will be explained in more detail hereafter, the reactor internals also include rectilinearly moveable control rods 28 for controlling the nuclear reaction within the core. The control rod assemblies, commonly known as rod cluster control mechanisms, typically include a drive shaft 50 and a spider assembly 52 of neutron poison rods that are guided through the upper internals 26 and into aligned fuel assemblies 22 by control rod guide tubes 54. The guide tubes are fixedly joined to the upper support assembly 46 and are connected by a split pin 56 force fit into the top of the upper core plate 40. The pin configuration provides for ease of guide tube assembly and replacement if ever necessary and assures that the core loads, particularly under seismic or other high loading accident conditions, are taken primarily by the support columns 48 and not the guide tubes 54. This support arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on the lower core plate 36 in the core region of the nuclear reactor. In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 3, the grids 64 are conventionally formed from orthogonal straps that are interleaved in an egg-crate pattern with the adjacent interface of four straps defining approximately square support cells through which the fuel rods 66 are supported in transversely spaced relationship with each other. In many conventional designs, springs and dimples are stamped into the opposing walls of the straps that form the support cells. The springs and dimples extends radially into the support cells and capture the fuel rods therebetween, exerting pressure on the fuel rod cladding to hold the rods in position. Also, the assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

To control the fission process, a number of control rods 28 are reciprocally movable in the guide thimbles 55 located at predetermined positions in the fuel assembly 22. Specifically, a rod cluster control mechanism 80 positioned above the top nozzle 62 supports the control rods 28. The control mechanism 80 has an internally threaded cylindrical hub member 82 with a plurality of radially extending flukes or arms 52. Each arm 52 is interconnected to one or more control rods 28 (the arrangement of the central hub and radially extending flukes is also referred to as a spider mechanism), such that the control rod mechanism 80 is operable to move the control rods vertically in the guide thimbles 55 to thereby control the fission process in the fuel assembly 22 under the motive power of control rod drive shafts 50 which are coupled to the control rod hubs 80, all in a well-known manner. In the withdrawn position, the control rods are guided up into the control rod guide tubes 55 above the upper core plate 40 and in the fully inserted position the control rods occupy substantially the entire length of the guide thimbles 54 within the fuel assemblies as shown in FIG. 3. Alignment of the control rods through the upper internals 26 with the guide thimbles 55 in the fuel assemblies is maintained by guide cards 70 supported in a spaced tandem arrangement along the length of the control rod guide tubes 54.

FIG. 4 shows an enlarged view of the control rod assembly guide tube 54 shown between the upper support assembly 46 and the upper core plate 40 in FIG. 2. The guide tube 54 is made up of two sections, a lower guide tube section 78 and an upper guide tube section 84. The lower guide tube section 78 has a generally square cross section while the upper guide tube section 84 has a generally rounded cross section. The lower guide tube section 78 is joined to the upper guide tube section 84 at an intermediate coupling 86. The upper and lower guide tube sections 84 and 78 have a plurality of guide cards 70 supported in tandem in spaced relationship to each other along the length of the guide tube 54 with a continuous guided section 88 extending up from the bottom of the guide tube 54 a distance approximately equal to the spacing between the guide cards 70.

FIG. 5 is representative of the pattern of the openings in the continuous guided section 88, the guide cards 70 and the guide plate at the intermediate coupling 86, through which the control rod assembly 80 passes as it travels through the upper internals 26. The three-quarter round openings 72 guide the individual control rods 28 with the flukes 52 passing through the straight portions 74 connecting the circular openings 72 to the central opening 76 through which the hub 82 passes. The guide card illustrated in FIG. 5 is from the upper section 84 of the guide tube 54, but the pattern of the openings are representative of the opening pattern in the other guides as well; the difference being that the shape of the outer circumference changes from circular to generally square as one transitions from the upper section 84 to the lower section 78 of the guide tube 54.

Aggressive guide card wear has been observed at some operating nuclear plants. When the special guide plate at the intermediate coupling 86 is located within the series of allowable worn guide cards 70, the guide plate can be replaced during an outage to extend the life of the guide tube, in lieu of replacing the lower guide tube assembly 78, if heavily worn. This mitigation technique reduces schedule, costs and radioactive waste generated while enabling continued safe plant operation, albeit for a limited portion of the remaining life of the plant.

Accordingly, a more permanent fix for guide card wear is desired that can be achieved on a similar schedule to that required to replace the guide plate at the intermediate coupling 86.

Additionally, such a repair is desired that would not require the generation of additional radioactive waste and is substantially comparable in cost to replacement of the guide plate.

SUMMARY

These and other objects are achieved for a nuclear reactor having a pressure vessel housing a core of fissile material and an upper core plate substantially covering the core. The nuclear reactor has a control rod guide tube with an extended axial length, for guiding a control rod assembly into and out of the core, which extends between the upper core plate and an upper support assembly supported above the upper core plate. The control rod guide tube has a lower guide section connected at a first end to the upper core plate and terminating at a second end at an intermediate coupling. The control rod guide tube also has an upper guide tube section connected at a first end portion to the upper support assembly and terminating at a second end at the intermediate coupling. The improvement comprises an extended control rod guide assembly that is supported substantially at the intermediate coupling and extends axially, a finite distance into at least one of an interior of the lower guide tube section or the upper guide tube section.

The control rod assembly comprises a plurality of control rods and, in at least one embodiment, at least some of the control rods are continuously guided over substantially an entire axial length of the control rod guide assembly. Preferably, some of the control rods are guided over discrete, spaced axial elevations along the axial length of the control rod guide assembly and, desirably, the control rods extending along the cardinal axis of the control rod guide assembly are continuously guided over substantially the entire axial length of the control rod guide assembly. In an additional embodiment all of the control rods are continuously guided over substantially an entire axial length of the control rod guide assembly.

In one embodiment, the control rod guide assembly has a first axially extending segment and a second axially extending segment with the first segment extending into the lower guide tube section and the second segment extending into the upper guide tube section. Preferably, in this latter embodiment, the first segment terminates at an upper end in a first guide plate, the second segment terminates at a lower end in a second guide plate and the first and second guide plates are joined at the intermediate coupling. Preferably, the first and second guide plates have openings through which all of the control rods pass and the first and second guide plates have either an alignment hole or an alignment pin for aligning the openings in the first guide plate with the corresponding openings in the second guide plate. Desirably, the first guide plate and the second guide plate, respectively, have a peripheral radially extending flange with each flange extending into a radial recess on a radial interior of the intermediate coupling, which clamps the flanges together.

In another embodiment, the control rod guide assembly extends approximately between 0.9 and 23 inches (2.3 and 58.4 cm). More preferably, the control rod guide assembly extends axially approximately between 0.9 and 7 inches (2.3 and 17.8 cm).

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
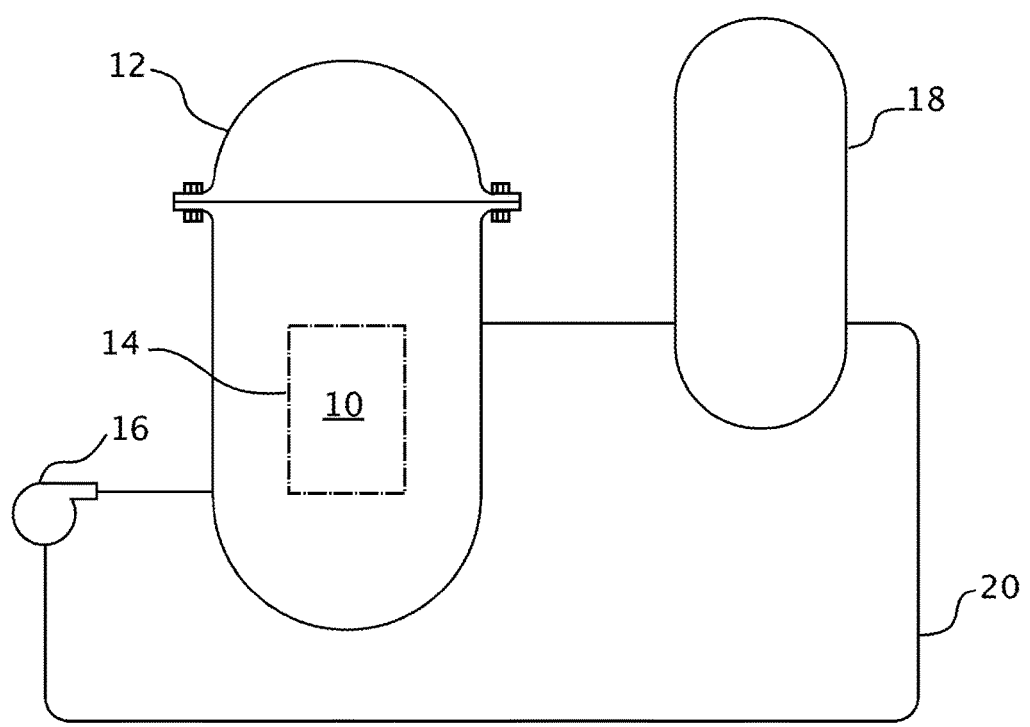
FIG. 1 is a simplified schematic of a nuclear reactor to which this invention may be applied.
Figure 2:
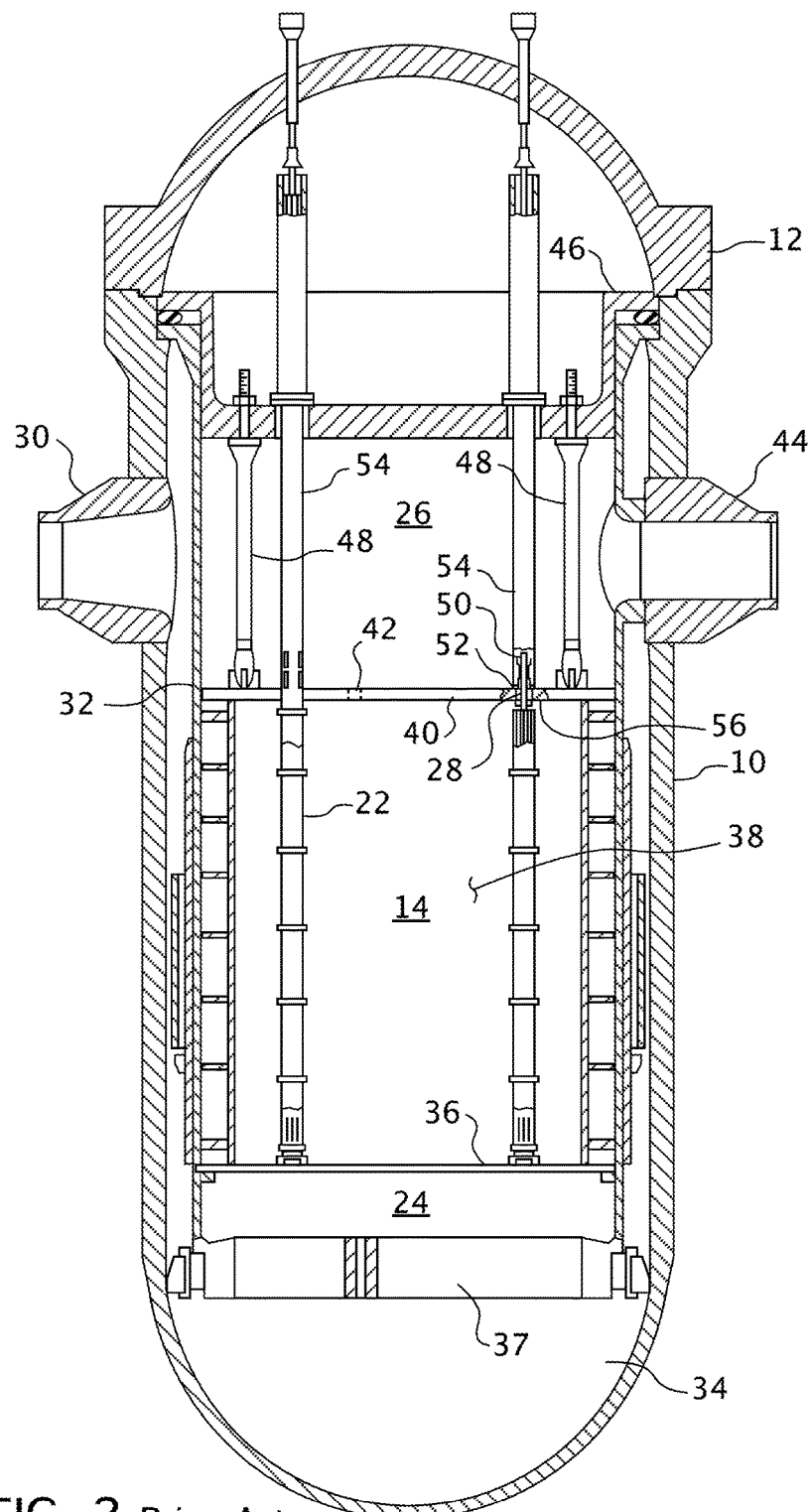
FIG. 2 is an elevational view, partially in section, of a nuclear reactor vessel and internal components to which this invention may be applied.
Figure 3:
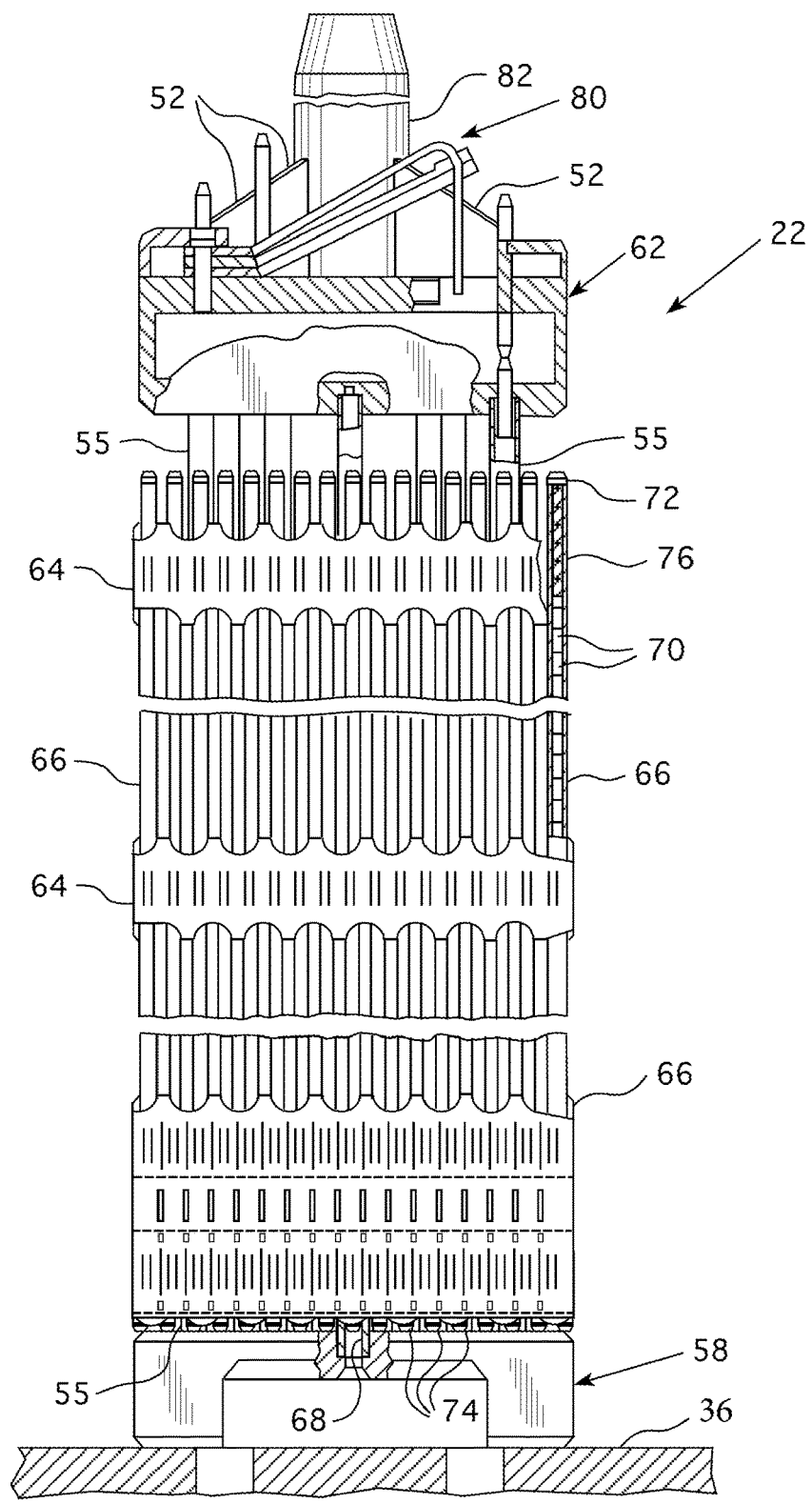
FIG. 3 is an elevational view, partially in section, of a fuel assembly illustrated in vertically shortened form with parts broken away for clarity.
Figure 4:
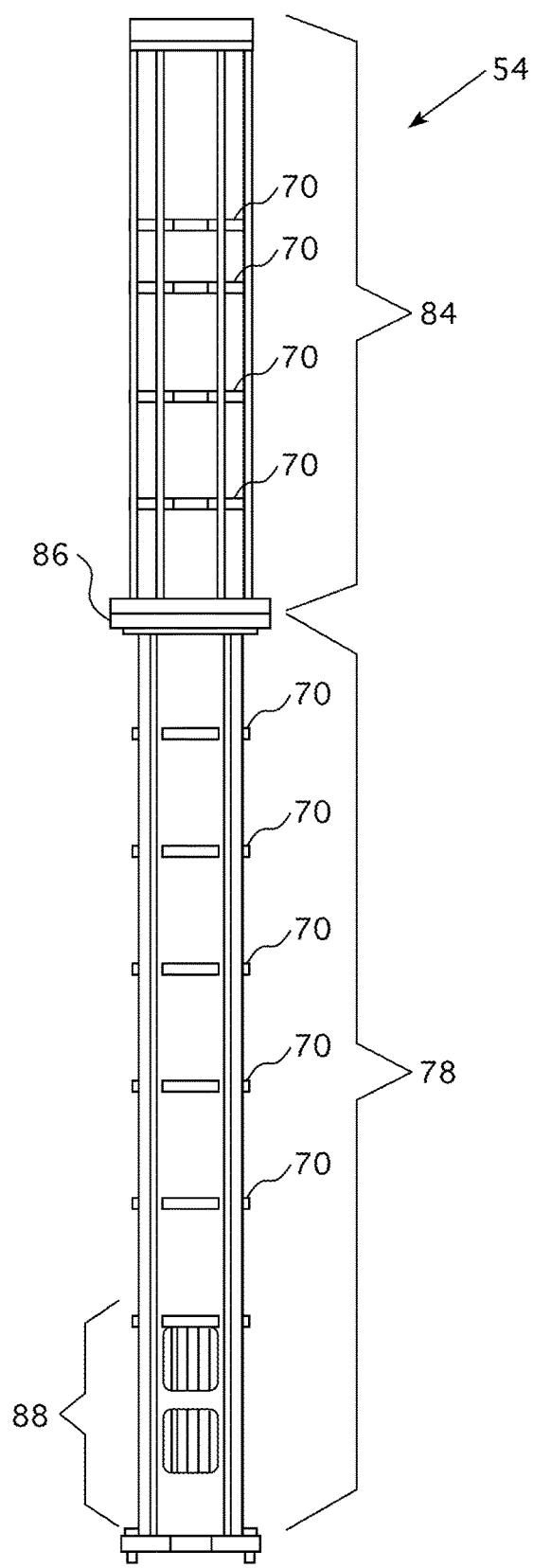
FIG. 4 is an enlarged isometric view of the control rod guide tube 54 illustrated in FIG. 2.
Figure 5:
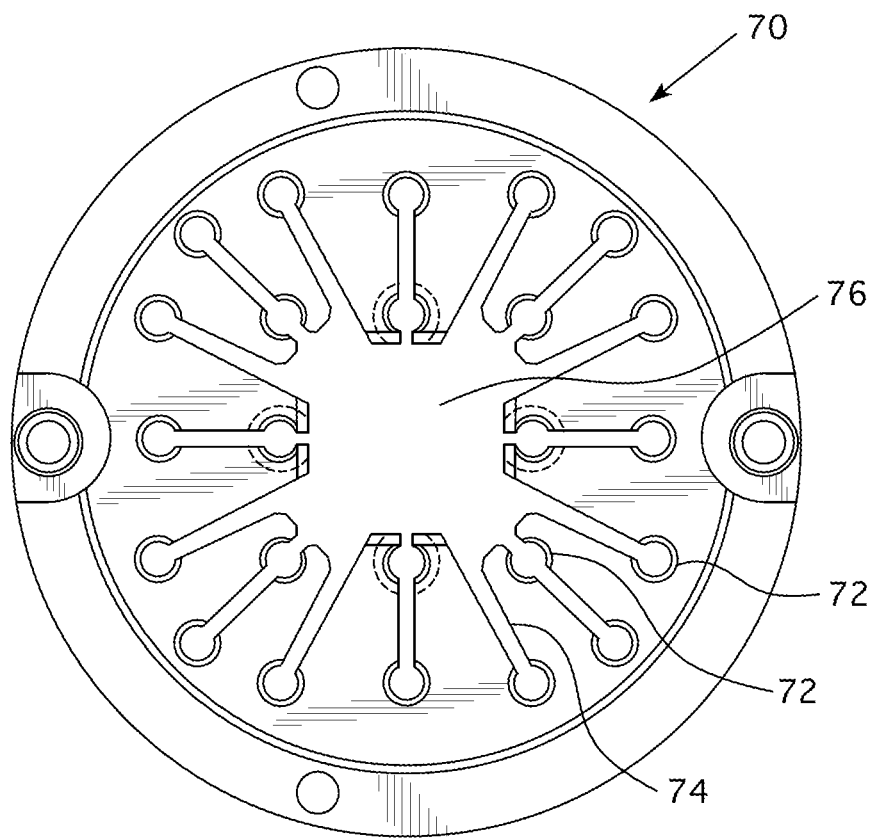
FIG. 5 is a plan view of one of the guide cards in the upper guide tube 84 illustrated in FIG. 4.
Figure 6:
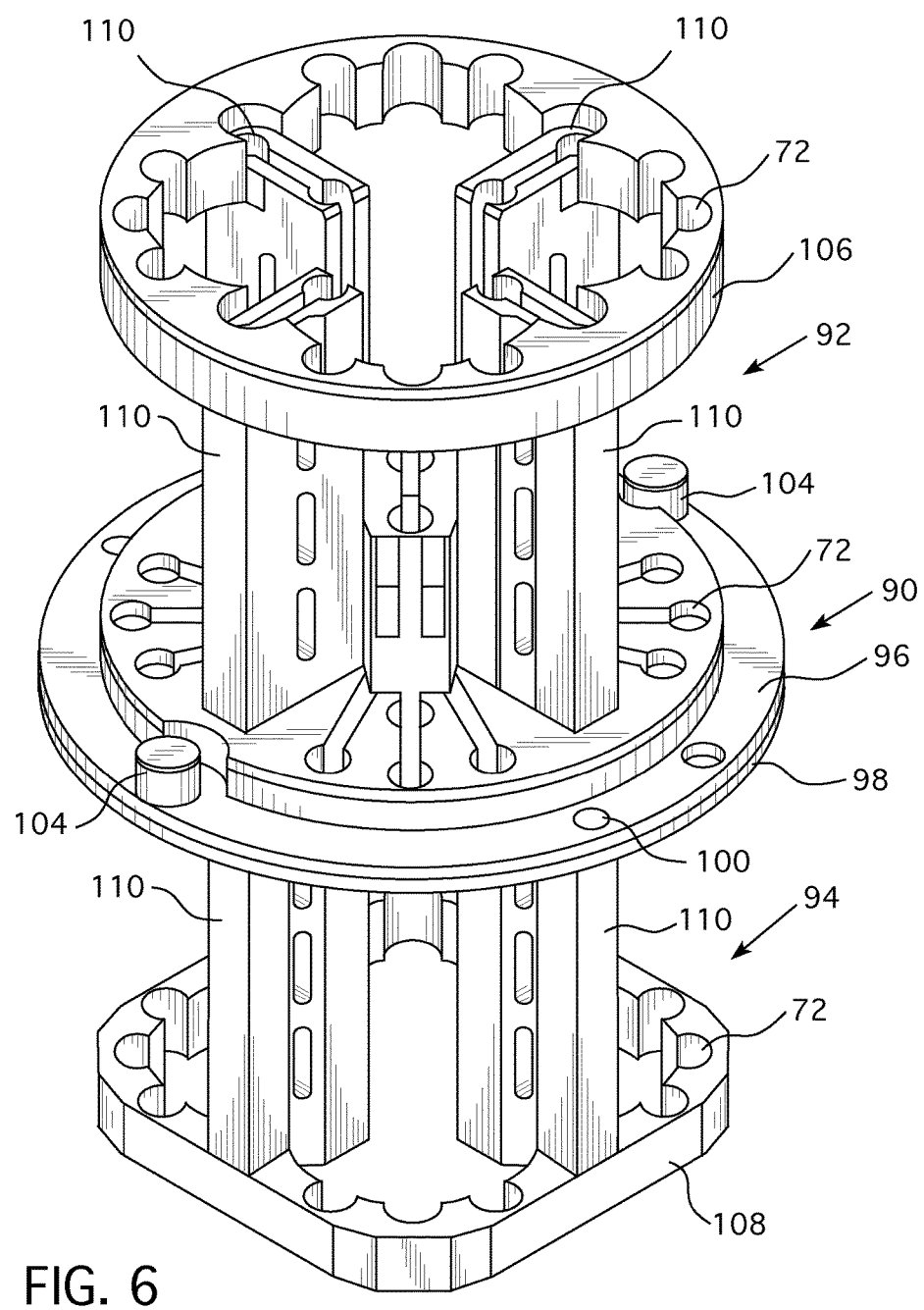
FIG. 6 is a perspective view of an extended control rod guide assembly which is inserted within the intermediate coupling in place of a worn guide plate, in accordance with one embodiment of this invention.
Figure 7:
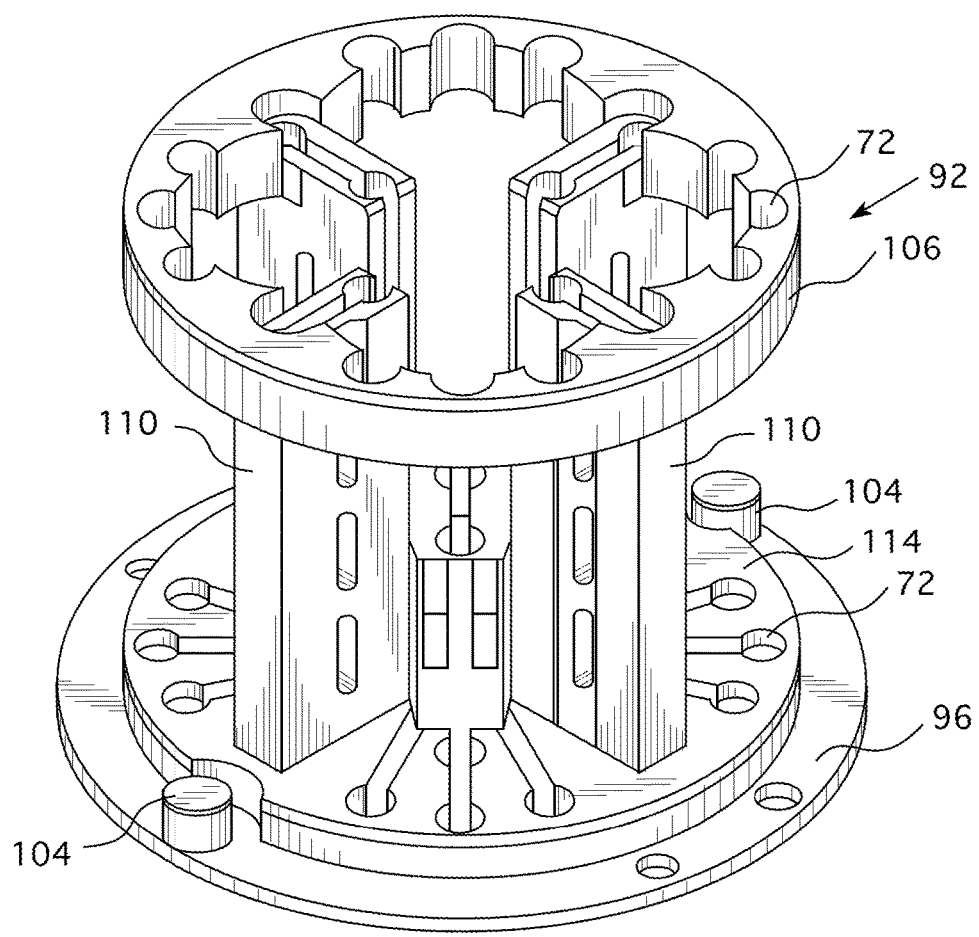
FIG. 7 is a perspective view of the upper segment of the extended control rod guide assembly shown in FIG. 6.

The useful life of a guide tube 54 can be substantially extended by replacing the guide plate at the intermediate coupling 86 during a refueling outage with the extended control rod guide assembly of this invention, one embodiment of which is illustrated in FIG. 6. This invention provides an extended control rod guide assembly 90 that is supported substantially at the intermediate coupling 86 and extends axially, a finite distance into at least one of the interior of the lower guide tube section 78 or the upper guide tube section 84. The embodiment illustrated in FIG. 6 extends into both the upper guide tube section 84 and the lower guide tube section 78 and is formed from a lower segment 94 and an upper segment 92. The upper segment 92 has a guide plate 114 at its lower end with openings 72 that substantially match the openings in the guide card 70 and terminates at its upper end 106 with a guide ring with peripheral openings 72 that support a portion of the circumference of the outer row of control rods 28. In addition, continuous support between the lower support plate 114 and the upper support ring 106 is provided by the support channels 110 for the control rods at the cardinal axes of the control rod assembly. Thus, discrete axially spaced support for some of the control rods 28 are provided while continuous support is provided for other of the control rods 28 over the upper segment 92 of the extended control rod guide assembly 90.

Figure 8:
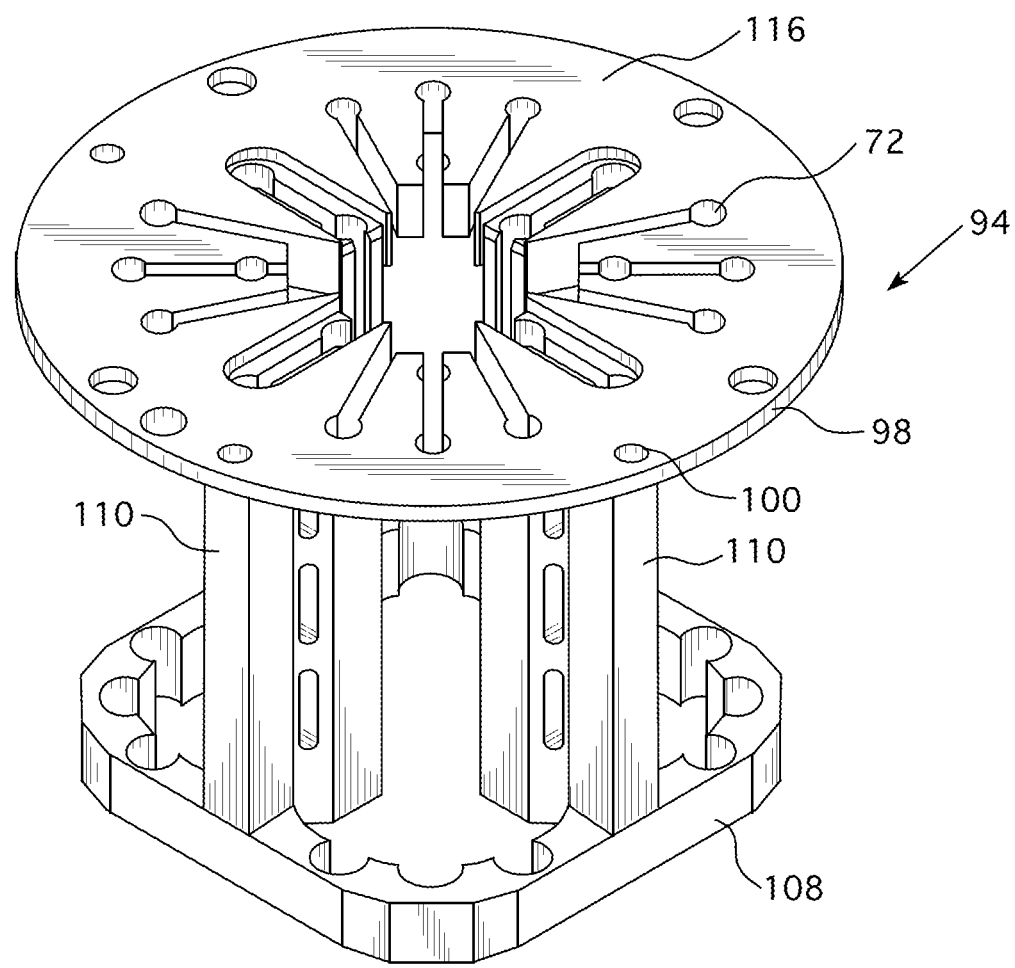
FIG. 8 is a perspective view of the lower segment of the extended control rod guide assembly shown in FIG. 6.

The lower segment 94 of the extended control rod guide assembly of this embodiment terminates at its upper end in a guide plate 116 with openings that correspond to the openings in the guide plate 114 on the upper segment 92. The lower segment 94 terminates at its lower end in a guide ring 108 which is connected to the guide plate 116 by the continuous support channels 110 as shown in FIG. 8. The upper guide plate 114 and the lower guide plate 116 are joined by the bolts 104 and aligned through an alignment pin in one or the other of the guide plates, that fits through an alignment hole 100 in the other of the guide plates to assure the openings 72 in the guide plates 114 and 116 are lined up.

Figure 9:
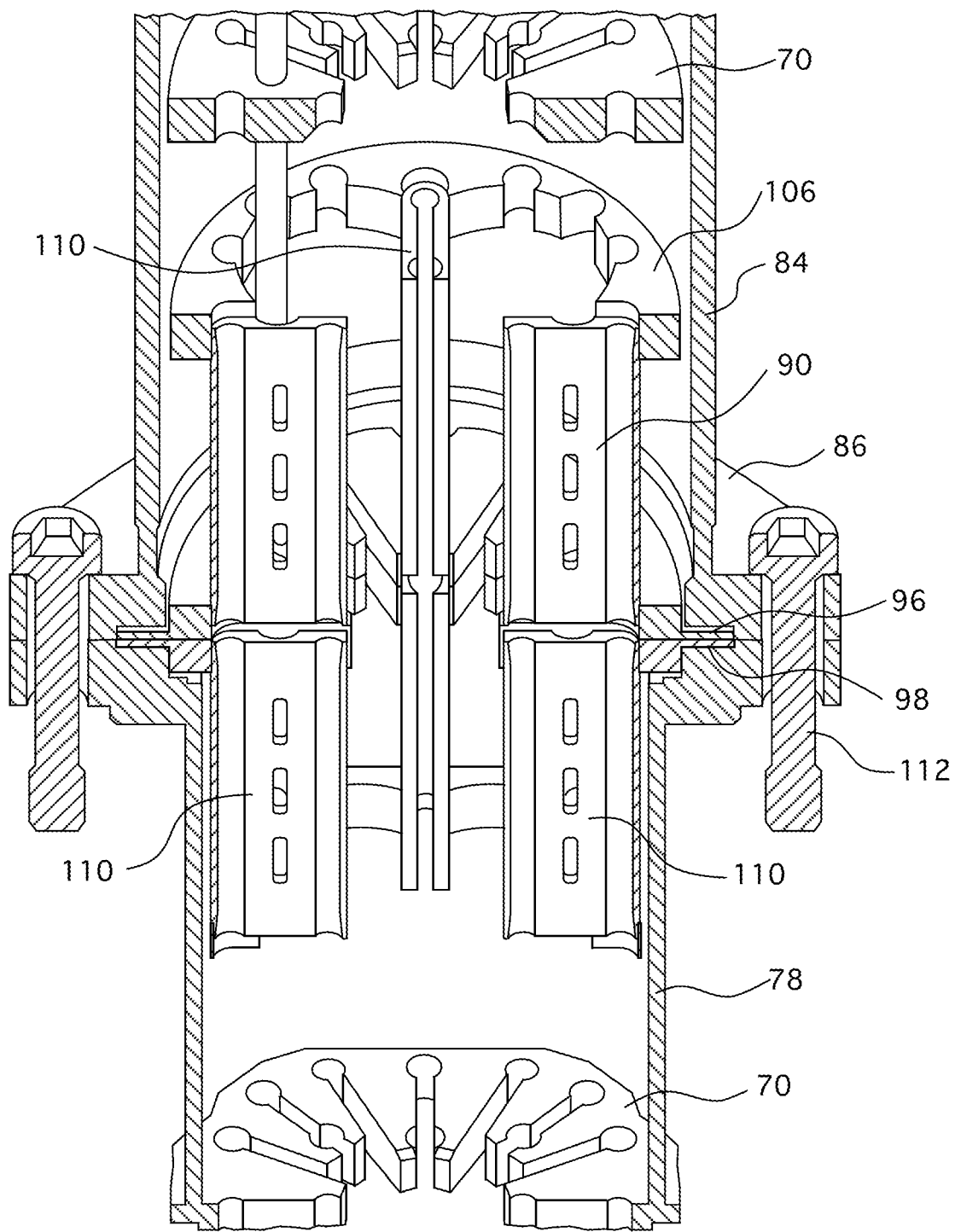
FIG. 9 is a cross sectional view of the upper internals guide tube 54 taken at the intermediate coupling location with the extended control rod guide assembly of one embodiment of this invention incorporated therein.
Figure 10:
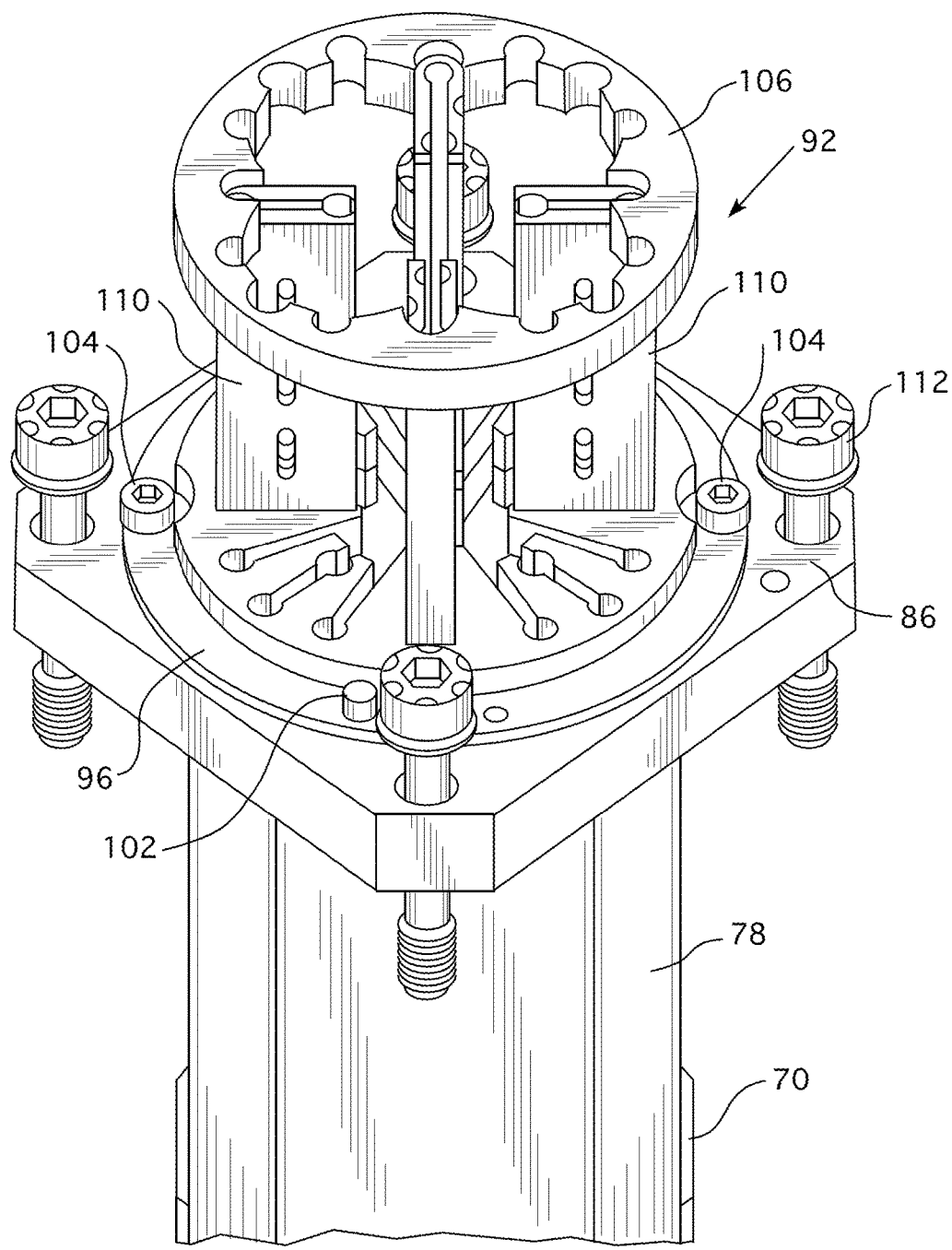
FIG. 10 is a perspective view of the extended control rod guide assembly of one embodiment of this invention installed in the lower guide tube 78.
Figure 11:
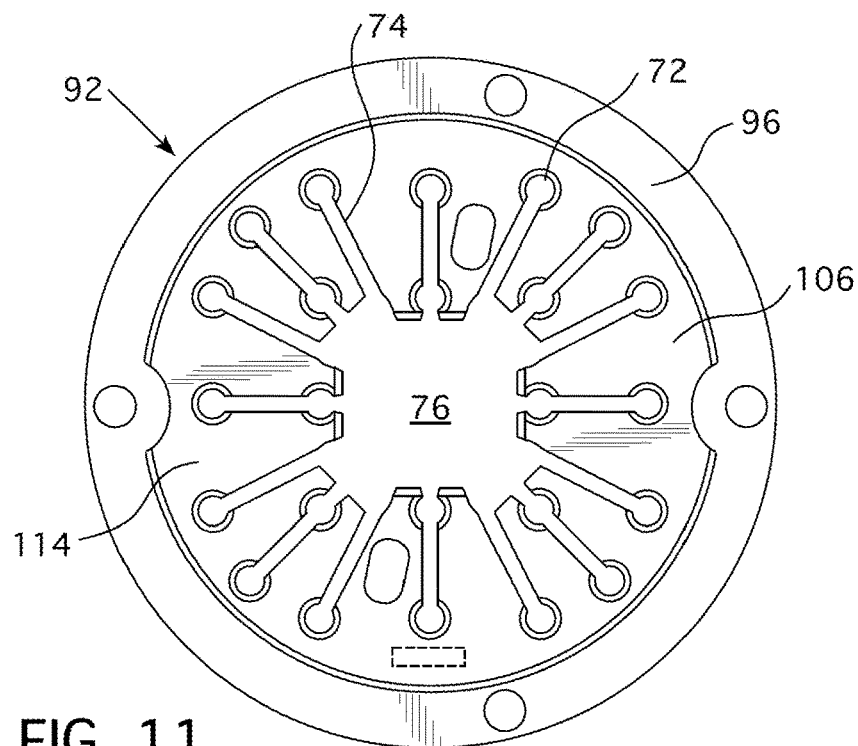
FIG. 11 is a plan view of an upper section of a second embodiment of the control rod guide assembly of this invention.
Figure 12:
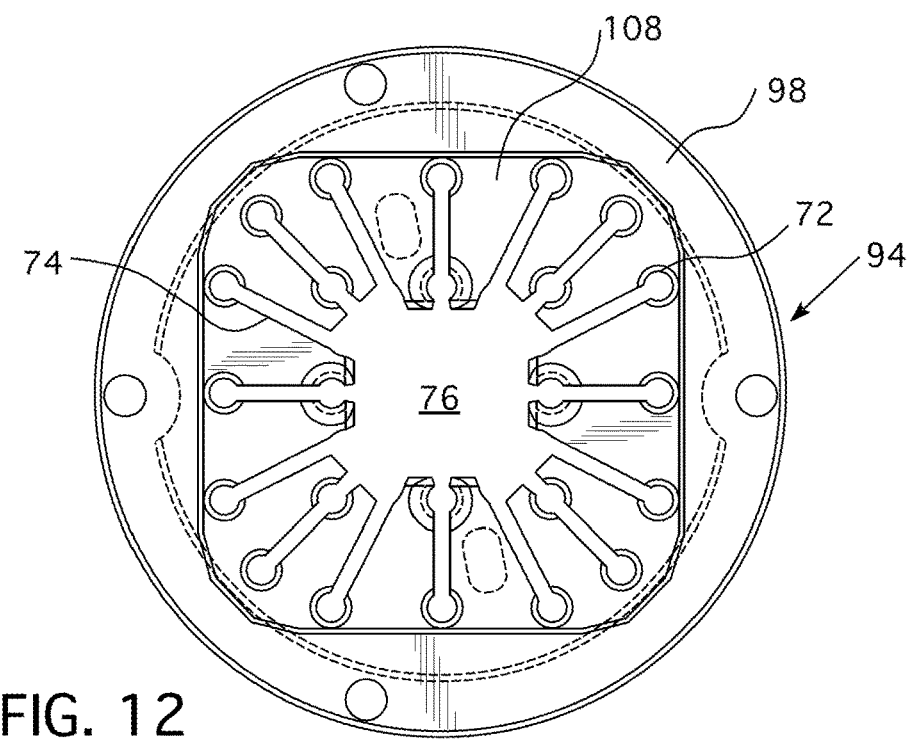
FIG. 12 is a plan view of the lower section of the second embodiment of the control rod guide assembly illustrated in FIG. 11.
Figure 13:
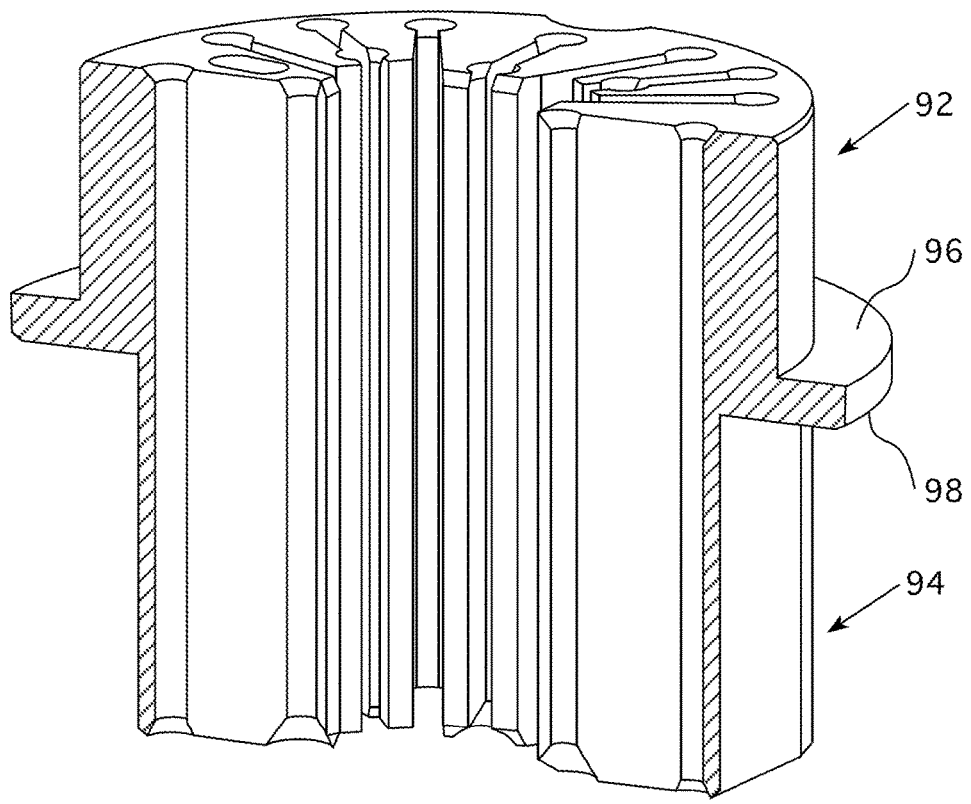
FIG. 13 is a cross sectional view of another embodiment of the control rod guide assembly in which the upper guide tube section and the lower guide tube section are constructed as a solid member.
Figure 14:
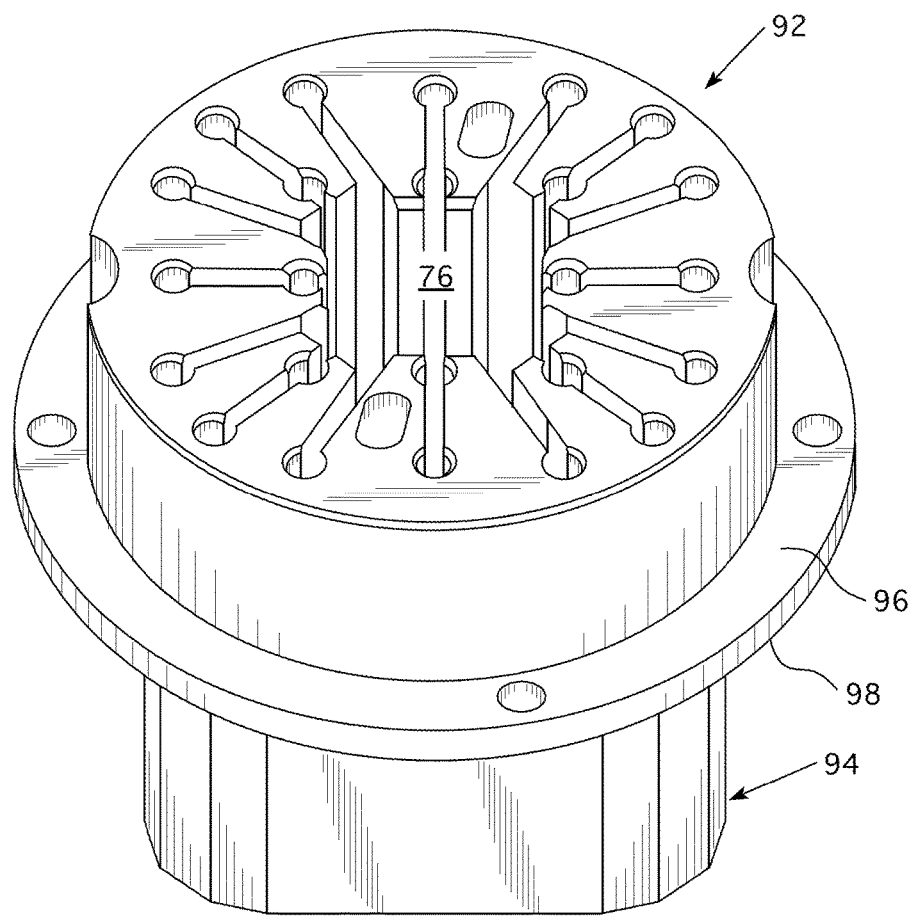
FIG. 14 is a perspective view of the embodiment shown in FIG. 13.

FIG. 9 shows the extended control rod guide assembly 90 with its flanges 96 and 98 installed in a recess in the intermediate coupling 86 which is locked in place by the bolts 112. FIG. 10 shows a perspective view of the upper segment 92 of the extended control rod guide assembly 90 installed within the lower guide tube section 78 with the flange 96 resting on the lower flange of the intermediate coupling 86. In this embodiment where not all of the control rods receive continuous support over the length of the extended control rod guide assembly, the control rod guide assembly may extend approximately between 0.9 and 23 inches (2.3 and 58.4 cm). More preferably, this type of control rod guide assembly extends axially approximately between 0.9 and 7 inches (2.3 and 17.8 cm).

Like reference characters are employed for corresponding components among the several views. In another embodiment, shown in FIGS. 11-14, the upper segment 92 and the lower segment 94 of the extended control rod guide assembly 90 are respectively made of a solid continuous length of material such as stainless steel with the openings 72, 74 and 76 providing continuous guidance for all of the control rods over substantially the entire length of the extended control rod guide assembly. As in the above case the upper segment 92 and the lower segment 94 may be joined at the intermediate coupling 86 which captures the respective flanges 96 and 98. Alternately, the upper segment 92 and the lower segment 94 can be constructed as one piece with the flange 96/98 radially extending from an intermediate elevation for capture within the intermediate coupling. In this latter embodiment, the control rod guide assembly may extend approximately between 1.6 and 23 inches (4.1 and 58.4 cm). More preferably, the control rod guide assembly extends axially approximately between 1.6 and 7 inches (4.1 and 17.8 cm).

Thus, the extended control rod guide assembly of this invention, when installed, provides extended support for the control rod assembly that compensates for some of the wear in the guide cards 70, while adding a minimum of additional friction to the control rod travel path and substantially extends the life of a control rod guide tube 54 without requiring replacement of either of the guide tube sections.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor including a pressure vessel housing a core of fissile material and an upper core plate substantially covering the core, a control rod guide tube having an extended axial length, for guiding a control rod assembly comprising a plurality of individual control rods, into and out of the core, the control rod guide tube extending between the upper core plate and an upper support plate supported above the upper core plate, the control rod guide tube comprising:
a lower guide tube section connected at a first end to the upper core plate and terminating at a second end at a rigid intermediate coupling;
an upper guide tube section connected at a first end portion to the upper support plate and terminating at a second end at the rigid intermediate coupling; and
an extended control rod guide assembly supported substantially at the rigid intermediate coupling and extending axially, a finite distance into at least one of an interior of the lower guide tube section or the upper guide tube section, the extended control rod guide assembly being configured to provide support for the plurality of individual control rods, wherein the finite distance is substantially less than the extended axial length of the control rod guide tube, and wherein the extended control rod guide assembly comprises at least one flange installed in a recess in the intermediate coupling.

2. The nuclear reactor of claim 1 wherein at least some of the plurality of control rods are continuously guided over substantially an entire axial length of the extended control rod guide assembly.

3. A nuclear reactor including a pressure vessel housing a core of fissile material and an upper core plate substantially covering the core, a control rod guide tube having an extended axial length, for guiding a control rod assembly comprising a plurality of individual control rods, into and out of the core, the control rod guide tube extending between the upper core plate and an upper support plate supported above the upper core plate, the control rod guide tube comprising:
a lower guide tube section connected at a first end to the upper core plate and terminating at a second end at a rigid intermediate coupling;
an upper guide tube section connected at a first end portion to the upper support plate and terminating at a second end at the rigid intermediate coupling; and
an extended control rod guide assembly supported substantially at the rigid intermediate coupling and extending axially, a finite distance into at least one of an interior of the lower guide tube section or the upper guide tube section, the extended control rod guide assembly being configured to provide support for the plurality of individual control rods, wherein the finite distance is substantially less than the extended axial length of the control rod guide tube, wherein at least some of the plurality of control rods are continuously guided over substantially an entire axial length of the extended control rod guide assembly, and wherein some of the control rods are guided over discrete axial sections of the extended control rod guide assembly.

4. The nuclear reactor of claim 3 wherein the control rods guided over continuous sections are provided with support by support channels extending through cardinal axes of the extended control rod guide assembly.

5. The nuclear reactor of claim 2 wherein all of the control rods are continuously guided over substantially the entire axial length of the extended control rod guide assembly.

6. The nuclear reactor of claim 5 wherein the extended control rod guide assembly extends axially approximately between 1.6 and 23 inches (4.1 and 58.4 cm).

7. The nuclear reactor of claim 6 wherein the extended control rod guide assembly extends axially approximately between 1.6 and 7 inches (4.1 and 17.8 cm).

8. The nuclear reactor of claim 1 wherein the extended control rod guide assembly has a first axially extending segment and a second axially extending segment with the first segment extending into the lower guide tube section and the second segment extending into the upper guide tube section, with the first axially extending segment and the second axially extending segment being supported at the rigid intermediate coupling.

9. The nuclear reactor of claim 1 wherein the extended control rod guide assembly extends axially approximately between 0.9 and 23 inches (2.3 and 58.4 cm).

10. The nuclear reactor of claim 9 wherein the extended control rod guide assembly more preferably extends axially approximately between 0.9 and 7 inches (2.3 and 17.8 cm).

11. The nuclear reactor of claim 1 wherein at least some of the plurality of control rods are continuously guided over substantially an entire axial length of the extended control rod guide assembly, and are provided with support by support channels extending through cardinal axes of the extended control rod guide assembly.

12. The nuclear reactor of claim 3 wherein the extended control rod guide assembly extends axially approximately between 1.6 and 23 inches (4.1 and 58.4 cm).

13. The nuclear reactor of claim 12 wherein the extended control rod guide assembly extends axially approximately between 1.6 and 7 inches (4.1 and 17.8 cm).

14. The nuclear reactor of claim 3 wherein the extended control rod guide assembly has a first axially extending segment and a second axially extending segment with the first segment extending into the lower guide tube section and the second segment extending into the upper guide tube section, with the first axially extending segment and the second axially extending segment being supported at the rigid intermediate coupling.

15. The nuclear reactor of claim 3 wherein the extended control rod guide assembly extends axially approximately between 0.9 and 23 inches (2.3 and 58.4 cm).

16. The nuclear reactor of claim 15 wherein the extended control rod guide assembly more preferably extends axially approximately between 0.9 and 7 inches (2.3 and 17.8 cm).

* * * * *